(12) United States Patent
Reichinger et al.

(10) Patent No.: US 7,521,665 B2
(45) Date of Patent: Apr. 21, 2009

(54) SENSOR SYSTEM, SENSOR ELEMENT, AND METHOD WITH A LIGHT SENSOR AND AN ELECTRICAL SENSOR FOR MONITORING A CLOSING MECHANISM

(75) Inventors: Gerhard Reichinger, Rednitzhembach (DE); Georg Kodl, Nuremberg (DE); Michael Frommberger, Nuremberg (DE); Christoph Weiss, Wendelstein (DE); Keith Vosburgh, Waterford, MI (US); Masaaki Yuge, Ann Arbor, MI (US)

(73) Assignees: LEONI AG, Nuremberg (DE); GECOM Corporation, Greensburg, IN (US)

( * ) Notice: Subject to any disclaimer, the term of this patent is extended or adjusted under 35 U.S.C. 154(b) by 82 days.

(21) Appl. No.: 11/775,004

(22) Filed: Jul. 9, 2007

(65) Prior Publication Data

US 2008/0006763 A1    Jan. 10, 2008

Related U.S. Application Data

(60) Provisional application No. 60/819,530, filed on Jul. 7, 2006.

(51) Int. Cl.
*H01J 40/14* (2006.01)
(52) U.S. Cl. .................. 250/221; 250/214 R
(58) Field of Classification Search .......... 250/221, 250/214 R, 201.1, 227.14; 340/463, 507, 340/545.1, 545.4, 555–557, 5.72; 280/735; 180/281, 286, 289
See application file for complete search history.

(56) References Cited

U.S. PATENT DOCUMENTS

| | | | |
|---|---|---|---|
| 4,240,528 A | 12/1980 | Kraus | |
| 4,995,639 A * | 2/1991 | Breed | .......... 280/735 |
| 5,801,340 A | 9/1998 | Peter | |
| 6,144,790 A | 11/2000 | Bledin | |
| 6,157,024 A | 12/2000 | Chapdelaine et al. | |
| 6,377,009 B1 | 4/2002 | Philipp | |
| 6,600,284 B1 | 7/2003 | Weber et al. | |
| 2003/0005775 A1 | 1/2003 | Washeleski et al. | |
| 2003/0071727 A1 | 4/2003 | Haag et al. | |
| 2003/0081369 A1 | 5/2003 | Haag et al. | |
| 2005/0005706 A1 | 1/2005 | Reichinger et al. | |

FOREIGN PATENT DOCUMENTS

| | | |
|---|---|---|
| DE | 35 13 051 A1 | 10/1986 |
| DE | 40 36 465 A1 | 5/1991 |

(Continued)

*Primary Examiner*—Que T Le
(74) *Attorney, Agent, or Firm*—Laurence A. Greenberg; Werner H. Stemer; Ralph E. Locher

(57) ABSTRACT

In order to be able to reliably detect when an object is caught between two parts which move in relation to one another in a motor-driven closing mechanism, in particular in an electromotively driven window winder system, provision is made for the sensor system to have an optical pressure sensor as well as an electrical capacitive sensor in addition. The optical pressure sensor comprises a light-guiding element, a light source for injecting light into the light-guiding element and a light sensor for sensing the light which has been output. The electrical sensor comprises an electrode which is connected to a voltage source. Both sensors are each assigned to an evaluation unit for evaluating the respective signal.

28 Claims, 5 Drawing Sheets

FOREIGN PATENT DOCUMENTS

| | | |
|---|---|---|
| DE | 195 37 619 A1 | 4/1997 |
| EP | 0 648 628 A1 | 4/1995 |
| EP | 0 977 363 A2 | 2/2000 |
| WO | 86/02506 | 4/1986 |
| WO | 89/08352 | 9/1989 |
| WO | 00/09355 | 2/2000 |
| WO | 00/44018 | 7/2000 |
| WO | 01/08925 A1 | 2/2001 |
| WO | 01/56142 A1 | 8/2001 |
| WO | 02/12669 A1 | 2/2002 |
| WO | 02/48745 A1 | 6/2002 |
| WO | 02/101929 A2 | 12/2002 |
| WO | 03/038220 A1 | 5/2003 |
| WO | 2004/001438 A2 | 12/2003 |
| WO | 2004/023526 A2 | 3/2004 |
| WO | 2005/044639 A1 | 5/2005 |
| WO | 2005/059285 A1 | 6/2005 |

\* cited by examiner

SENSOR SYSTEM, SENSOR ELEMENT, AND METHOD WITH A LIGHT SENSOR AND AN ELECTRICAL SENSOR FOR MONITORING A CLOSING MECHANISM

CROSS-REFERENCE TO RELATED APPLICATION

This application claims the priority, under 35 U.S.C. § 119(e), of provisional application No. 60/819,530, filed Jul. 7, 2006; this application further claims the priority, under 35 U.S.C. § 119(d), of German patent application DE . . . , filed Jul. 7, 2006, and the priority, under 35 U.S.C. § 120, of international application PCT/DE2007/. . . , filed concurrently herewith; the foregoing applications are herewith incorporated by reference in their entirety.

BACKGROUND OF THE INVENTION

Field of the Invention

The invention relates to a sensor system and to a sensor element for such a sensor system. The sensor system is used, in particular, for monitoring a motor-driven closing mechanism for an object being caught between two parts of the closing mechanism which move in relation to one another. The invention also relates to a method for monitoring a closing mechanism.

In motor-driven closing mechanisms, such as are used in particular in the automobile industry, for example as electromotively actuated window lifters, sliding doors, tailgates, sliding roofs, and the like, an anti-catch device needs to be provided for safety reasons. An anti-catch system is used to minimize the risk of injury if a body part of a person unintentionally comes into the movement path of a motor-driven closing element, for example a window pane or door, etc., and is caught, for example against the vehicle body. In the event of something being caught in this way, the drive motor needs to be shut down rapidly in order to avoid injury. For this purpose, it is necessary for the closing system to identify the event of something being caught as such and to thereupon stop the drive motor.

In order to detect the event of something being caught, a sensor element may be provided which detects, for example, an impermissible pressure increase. Because of the risk of injury, safe detection of the event of an object being caught needs to be ensured.

SUMMARY OF THE INVENTION

It is accordingly an object of the invention to provide a sensor element, a sensor system, and a method of monitoring a closing mechanism which overcomes the above-mentioned disadvantages of the heretofore-known devices and methods of this general type and which ensures safe and reliable detection in particular in the event of something being caught.

With the foregoing and other objects in view there is provided, in accordance with the invention, a sensor system, comprising:

an optical pressure sensor having an optical sensor element with a light-guiding element;

a light source disposed for injecting light into the light-guiding element;

a light sensor for sensing light output from the light-guiding element;

a first evaluation unit connected to said light sensor for evaluating the light output from the light-guiding element;

an electrical sensor with an electrode connected to a voltage source; and a second evaluation unit connected to said electrical sensor for evaluating a voltage signal output by the electrical sensor.

In a preferred implementation of the invention, the optical pressure sensor and the electrical sensor are disposed for monitoring a motor-driven closing mechanism with regard to an object being caught between two relatively moving parts of the closing mechanism.

Illustratively, the sensor system has an optical pressure sensor and, in parallel with this, an electrical sensor, which may be, for example a capacitive sensor. Both optical pressure sensors and capacitive sensors and their design are known per se. Thus, international PCT publication WO 03/069294 A1, the disclosure of which is now incorporated herein by reference, describes one exemplary optical pressure sensor suitable for use in the sensor system described here.

The illustrative sensor system comprises two sensor units, which are used in parallel and illustratively next to one another and each of which alone is capable of detecting the event of something being caught. At the same time, however, the two sensor units are based on different evaluation and sensing principles. Here, the advantages of the two different sensing principles complement one another in an advantageous manner, with the result that safe and reliable detection of an abnormal event, as for example of something being caught, is reliably ensured even in unfavorable situations. For example and without limitation, one of the sensor units may have operating characteristics better than the other sensor in certain regimes and vice versa. So, too, one sensor unit illustratively may provide a back up to the other sensor unit in the event the other sensor unit suffers a failure or other degradation and vice versa.

The electrical sensor has the illustrative advantage that it can be in the form of a capacitive proximity sensor and therefore can already identify an object before this object touches the sensor itself. This sensor is therefore illustratively a contactless or touchless sensor. This makes it possible to shut the drive motor down early, for example, even before the object has actually been caught. However, in certain situations, reliable shutdown is not always ensured with such an electrical sensor. If, for example in the case of a sliding door, a hand is wrapped around the edge of the sliding door and the sliding door moves towards a stop, at which the electrical sensor is arranged, this electrical sensor may not be able to differentiate the hand from the actual edge of the sliding door. As a result, the sensor will in this case likely not detect an abnormal operating state and therefore not respond as desired.

In such a case, however, a reliable response of the optical pressure sensor is likely since it will detect the hand's pressure as an abnormal operating state and trigger a desired response, illustratively, the drive motor being shut down, or even reversed for a brief moment. Additional illustrative examples of instances where the optical sensor may outperform the electrical sensor include without limitation, disruptive effects, for example owing to electromagnetic incompatibility or owing to corrosion problems occurring over the course of time etc.

Thus, the illustrative invention combines two sensors operating under different principles, illustratively one generally optical and one generally electrical, in order to ensure safe shutdown. In some cases, both sensor types will be able to differentiate between normal operating states and abnormal operating states in which an object is caught or will be caught. In other instances, only one or the other of the sensor types may be able to differentiate between normal and abnormal operating states. In the illustrative embodiments, one, or the other, or both sensor systems generally will detect the present position of the associated motor-driven closing element in order to be able to decide whether the closing element itself is now moving towards the stop as desired or whether an object is present between the closing element and the stop.

Further illustrative configurations and developments are outlined in the dependent claims.

Illustratively, an optical sensor element includes an optical, cladding-free fiber, which is used as the light-guiding element for the optical sensor. The optical fiber is, for example and without limitation, a glass fiber or a plastic fiber or any other element which is suitable for guiding light waves. The light-guiding element is generally surrounded by a hose-like elastic casing or jacket, illustratively made of plastic or rubber. The optical fiber is illustratively loosely inserted or installed in this casing. Illustratively, the casing is, if need be, supported on the optical fiber at a few supporting points such that a space is otherwise formed between the sheath and the optical fiber.

Illustratively, the cladding-free optical fiber forms, together with the elastic casing surrounding it, an optical sensor element, as is described in international PCT publication WO 03/069294. The mode of operation of this illustrative sensor element is based on interference in the so-called evanescent field. The evanescent field forms in the outer region directly at the boundary surface of the optical fiber in the case of light propagation through the optical fiber. Conventional optical fibers are formed by a light-guiding core and cladding surrounding the core, which cladding is applied in the manner of a coating and acts as a reflective layer in order to ensure reflection which is as high as possible at the boundary surfaces between the core and the cladding of the electromagnetic wave propagating in the optical fiber. In contrast, the illustrative optical sensor element provided here illustratively comprises optical fiber without cladding. This makes it possible for the outer casing to be pressed against the optical fiber when pressure is applied to it and therefore to disrupt the evanescent field forming in the outer region at the boundary surface of the optical fiber. This interference is detected and evaluated by a suitable evaluation unit. One illustrative advantage of such an optical sensor can be seen in its rapid response since bending of the optical fiber itself is not required. Instead, it is sufficient for the optical fiber simply to come into contact with the casing in order to be able to detect a sufficient signal change.

In one illustrative embodiment, the casing is formed by a hose-like sheath having a hollow space or cavity in which the fiber is loosely inserted. The sheath illustratively is in the form of a sealing element, for example a sealing structure, which, for example, may be a door seal in a motor vehicle. The optical fiber is thus directly inserted, or lies directly in the sealing structure.

In an alternative illustrative embodiment, the casing is formed by a protective hose, which is passed through the sheath. In this case, the optical sensor element illustratively is a prefabricated unit or component, which is introduced into the sheath, for example, by means of an extrusion process or by laterally inserting it via a slot or by threading it in.

Furthermore, illustratively, provision is made for at least one wire, for a plurality of wires, or for wires forming braiding to extend or run along the light-guiding element and, in particular, to be wound, for example helically, around the light-guiding element. It will be appreciated that this at least one wire, or the illustrative plurality of wires or the illustrative wire braiding illustratively forms an electrode for the electrical sensor. It will be understood that, illustratively, the wire(s) may be wound directly around the optical fiber within the casing, or may be wound indirectly around the optical fiber as by winding the wire(s) around the protective hose within the sheath.

The electrode is generally a part of the electrical sensor which senses a change in the electrical field with the aid of the electrodes as soon as an object comes into the vicinity of the electrode and thus disrupts or changes the electrical field. This change in the electrical field is sensed and detected with the aid of the electrical sensor in a manner known to those skilled in the art.

Winding the wires around the optical fiber has a plurality of desirable characteristics. Firstly, a compact design is achieved, and, at the same time, the two sensor types illustratively run parallel over the entire length, for example, of a closing edge to be monitored. Furthermore, the production of such a combination of optical fiber or optical sensor element and wires wound around it generally is a relatively quick and cost-effective process that may be accomplished using conventional machines, as are used, for example, in wire production, such as in the production of coaxial cables.

In order to facilitate the functionality of the optical sensor in the illustrative embodiment in which the optical fiber is directly inserted or installed in the sheath and is directly surrounded by the electrode, provision is made for windows or regions to be kept free at regular intervals when winding wire braiding around the optical fiber such that, in these regions, the sheath can be pressed against the optical fiber. The open regions in this case illustratively form more than 50% of the surface of the optical fiber. One further desirable characteristic of the helical winding of the optical fiber with the wires can be seen in the fact that the wires at the same time act as spacers for the sheath. As has already been mentioned, it is desirable for the functionality of the optical sensor for an interspace (generally filled with air) to be arranged between the optical fiber and the sheath surrounding it such that the sheath is pressed against the surface of the optical fiber only when pressure is applied.

Illustratively, a second electrode is integrated in the wall of the sheath. One of the two electrodes in this case illustratively will act as a transmission electrode and the other electrode illustratively will act as a reception electrode. While it will be appreciated that either electrode may serve as either the transmission electrode or the reception electrode, illustratively the second electrode is used as the transmission electrode. Illustratively, a voltage source supplies an AC voltage, for example having a frequency in the kHz or MHz range, to the transmission electrode. The voltage source may comprise for example and without limitation a transistor. The associated wavelengths are in this case illustratively very long in comparison with the conventional length of the sensor element in the range from one to a few meters, with the result that there is a virtually steady state for the electrical evaluation electronics, i.e. the amplitude of the electrical voltage changes only insignificantly during the evaluation of the electrical signal. Upon application of the AC voltage, a type of response signal is set in the reception electrode, and this response signal is evaluated by the electrical evaluation unit. If the electrical field formed is disturbed by an object, this response signal changes and the evaluation unit senses the introduction of an object.

Illustratively, a flat cable, for example a flat braided wire, having a flexible nature suitable for use in the sensor element, may be used for the second electrode. The illustrative conductive flat braiding may be made from copper-conducting materials, for example and without limitation individual braided copper wires, but can also be formed from conductive woven plastic fabrics, by injected conductor tracks, or by other suitable materials and methods.

In the illustrative embodiments, the sheath illustratively may be formed by a sealing structure or a seal, which is arranged on an edge side of a closing element or of a stop for the closing element or on both. The sealing structure in this case is made from, for example and without limitation, rubber, a suitable plastic, or other suitable material.

Also disclosed is an exemplary sensor element for use in the illustrative sensor system(s).

Further disclosed is a method of detecting an obstacle or object, such as an animal's extremity, which may impede or get caught in a closing mechanism. The illustrative method illustratively uses a sensor system to monitor a closing mechanism for an object possibly being caught between two parts of the closing mechanism. The two parts of the closing mechanism may move relative to each other, or one of the two parts may move relative to the other of the parts. The closing mechanism illustratively may comprise for example and without limitation a motor-driven window winding device, a sliding door device, or another closing system. In the method, the closing mechanism is monitored in a parallel manner by two sensors operating under different principles. For example, one sensor may comprise an optical pressure sensor and the other may comprise an electrical sensor, for example a capacitive sensor. The capacitive sensor illustratively reacts to the approach of an object, for example a human extremity or other object, before it is caught, the optical pressure sensor illustratively may be sensitive to the exertion of pressure on the optical sensor element. As described further herein, the two sensors therefore complement each other to form a reliable anti-catch system.

In the illustrative embodiment(s), the electrical sensor operates like a capacitive proximity sensor. In general, the at least one electrode generates an electrical field around that electrode. The air around the electrode can be considered to be a dielectric which is disturbed or disrupted when an object enters the area or field surrounding the electrode, with the result that it is generally possible to determine a change in the electrical field, which change can be identified using a suitable evaluation logic unit. A defined electrical field surrounding the sensor is therefore generated by exciting the electrode in a suitable manner.

During normal operation, for example during the unimpeded closing process, this electrical field undergoes a characteristic change, which can be referred to as a normal signature, on account of the two parts which can move in relation to one another moving toward one another. The logic unit or evaluation electronics are informed of this normal signature by means of a learning process, for example. As soon as an external object passes between the two parts which can move in relation to one another, this characteristic or normal signature is disrupted. Such a disruption is identified by the evaluation electronics as being an abnormal event, for example of something being caught or something in peril of being caught as indicated by the disrupted signature exceeding a particular tolerance limit.

In a manner parallel to this, a check is continuously carried out, either without interruption or at periodic intervals, in order to determine whether a pressure is being exerted on the optical pressure sensor. As soon as sufficient contact is made with the optical sensor element, the elastic casing, that is to say either the sheath (sealing structure) or the protective hose depending on the illustrative embodiment, is pushed against the optical fiber, and the propagation of light in the optical fiber is disrupted, which is identified as an abnormal event as for example of something being caught. A learning process is also provided for in the pressure sensor in order to avoid identifying the normal closing process as being an abnormal event of something being caught since, when the two parts which can be displaced in a relative manner meet, for example when the sliding door runs against the frame, a pressure is normally or naturally exerted on the sealing structure. In the illustrative embodiment(s), the evaluation electronics for the pressure sensor take account of the true actual position of the adjusting element, for example the door or the window pane, which moves in relation to a frame part. It will be appreciated, however, that the invention may be adapted for use with two moving parts, moving in relation to each other. Illustratively, this relative position may either be actively determined using a suitable sensor or may be determined by evaluating the motor driving of the motor drive of the sliding mechanism. The position data which are obtained in this manner for the sliding mechanism may of course also be used for the electronic sensor and the evaluation of the electrical signal.

The signals from both the electrical sensor and the optical pressure sensor are illustratively evaluated with the aid of a suitable evaluation algorithm in order to ensure that the event of something being caught or in peril of being caught, i.e., an abnormal event, is identified in a reliable manner. For evaluation in the evaluation algorithm, the sensor signals are converted or coded in a suitable manner for them to be able to be evaluated by the algorithm.

As soon as one of the two sensors with the associated evaluation electronics detects an event of something being caught or in peril of being caught, a suitable warning or stop signal is emitted by the evaluation electronics and the motor drive of the closing mechanism is stopped and, if necessary, is additionally reversed. In this case, provision may be made for the signal which is emitted by the evaluation electronics to be transmitted to a central control unit, for example a control module, which then stops the drive module.

In order to provide reliable operation, the functionality of the two sensors may be monitored continuously. To this end, the functionality of the sensors is tested or checked in a suitable manner either at periodic intervals of time or permanently. The check is evaluated and the current operating state signal (for example and without limitation, "functional", "not functional", "degraded", "disabled") is forwarded to a central control unit such as for example the central door control module. Illustratively, the central control module can thus discern at any time whether the anti-catch monitoring system is active and operating as desired. The state signal for the respective sensor can alternatively also be interrogated by the central unit.

Other features which are considered as characteristic for the invention are set forth in the appended claims.

Although the invention is illustrated and described herein as embodied in sensor system and sensor element as well as method for monitoring a closing mechanism, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
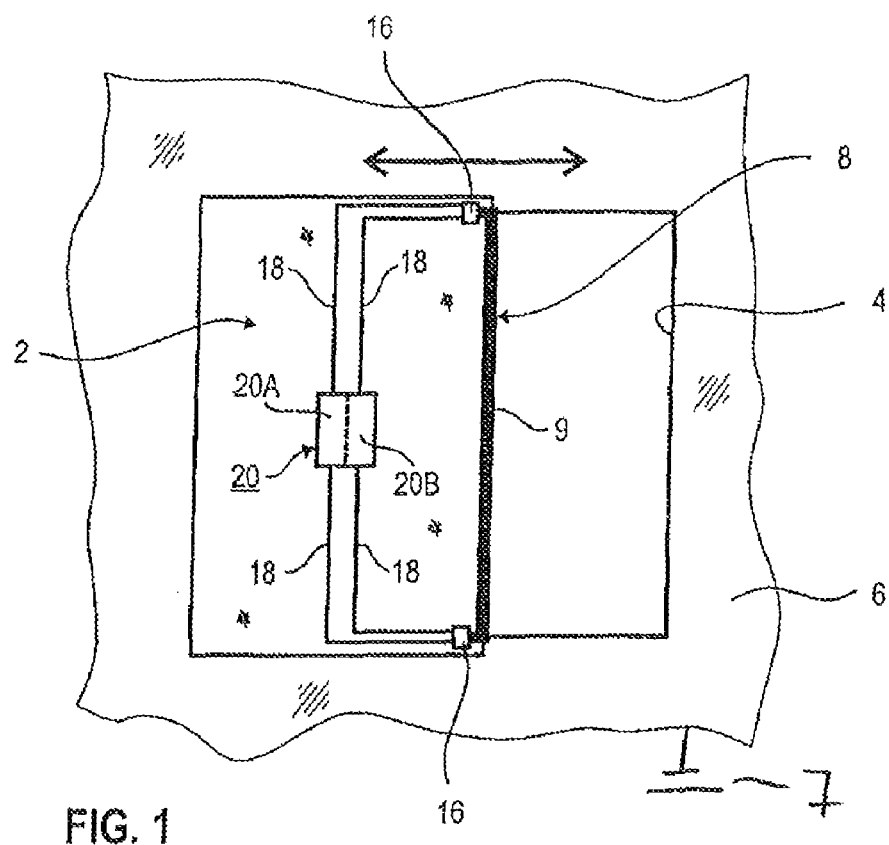
FIG. 1 is a diagrammatic view showing a sliding door which can be displaced by way of a motor.

Referring now to the figures of the drawing in detail and first, particularly, to FIG. 1 thereof, there is shown a closing mechanism with reference to the exemplary embodiment of a sliding door 2, which is mounted displaceably in a guide in the direction of the double arrow and can be moved towards a stop 4, in particular on a motor vehicle body 6, into a closing or closed position. The vehicle body 6 is at ground potential 7. The sliding door 2 has a sensor element 8 on its front end side, which is oriented towards the stop 4. Alternatively, the sensor element may also be arranged on the corresponding end side of the stop 4 or both on the end side of the sliding door 2 and on that of the stop 4. In this case, the sensor element 8 is formed by a rubber sealing profile 9, in which an optical fiber 10, a first electrode 12, which is wound helically around it, and preferably also a second electrode 14 are integrated (cf. in this regard FIGS. 2-11).

In the exemplary embodiment shown in FIG. 1, coupling elements 16 are provided at both ends of the sensor element 8, via which coupling elements electrical connecting lines 18 pass to an evaluation unit 20. In the coupling elements 16, light is injected into or output from the optical fiber 10 with the aid of a light source (LED—not illustrated in any more detail here) and a light sensor (not illustrated in any more detail here). At the same time, the electrical supply or coupling of the two electrodes 12, 14 is brought about via the coupling elements. The coupling elements 16 are in this case preferably in the form of plug-in connections, in each case combined coupling elements 16 preferably being provided here, via which both the optical fiber 10 and the two electrodes 12, 14 can be coupled together.

The evaluation unit 20 in this case comprises two subunits, namely an electrical evaluation subunit 20A and an optical evaluation subunit 20B. The electrical evaluation subunit 20A is used for evaluating the electrical signals from the electrical sensor subelement, and the optical evaluation subunit 20B is used for evaluating the signals from the optical sensor subelement.

Sensor sub-elements are in this case understood to mean in each case those elements which are required for forming, on the one hand, the electrical sensor and, on the other hand, the optical sensor. In the case of the electrical sensor subelement, these are the at least first electrode 12 and the two electrodes 12, 14 in the exemplary embodiment. In the case of the optical sensor subelement, this is the optical fiber 10 with the sheath surrounding it, which is formed by the sealing profile 9, the sealing profile 9 for the optical fiber 10 enclosing an interspace or free space, which is generally filled with air.

Semiconductor modules suitable as the light source and as the light sensor are preferably provided in the coupling elements 16, which semiconductor modules emit or detect light by means of corresponding electrical driving and convert it into an electrical signal, which is then passed back to the optical evaluation subunit 20B via the connecting line 18.

The optical evaluation subunit 20B, the optical sensor subelement and the coupling elements 16 form an optical pressure sensor which is based on the evaluation of interference to or a change in the evanescent field propagating in the optical fiber 10. As soon as a pressure is exerted on the sealing profile 9, the sealing profile 9 is pressed against the optical fiber 10, as a result of which the evanescent field is disrupted and, as a result, a signal change is in turn generated which is sensed by the optical evaluation subunit 20B.

An electrical, in particular capacitive sensor is formed in parallel with the optical pressure sensor over the entire length of the sensor element 8, which sensor comprises the two electrodes 12, 14, the electrical evaluation subunit 20A and the electrical supply lines 18 to the evaluation subunit 20A.

Figure 2:
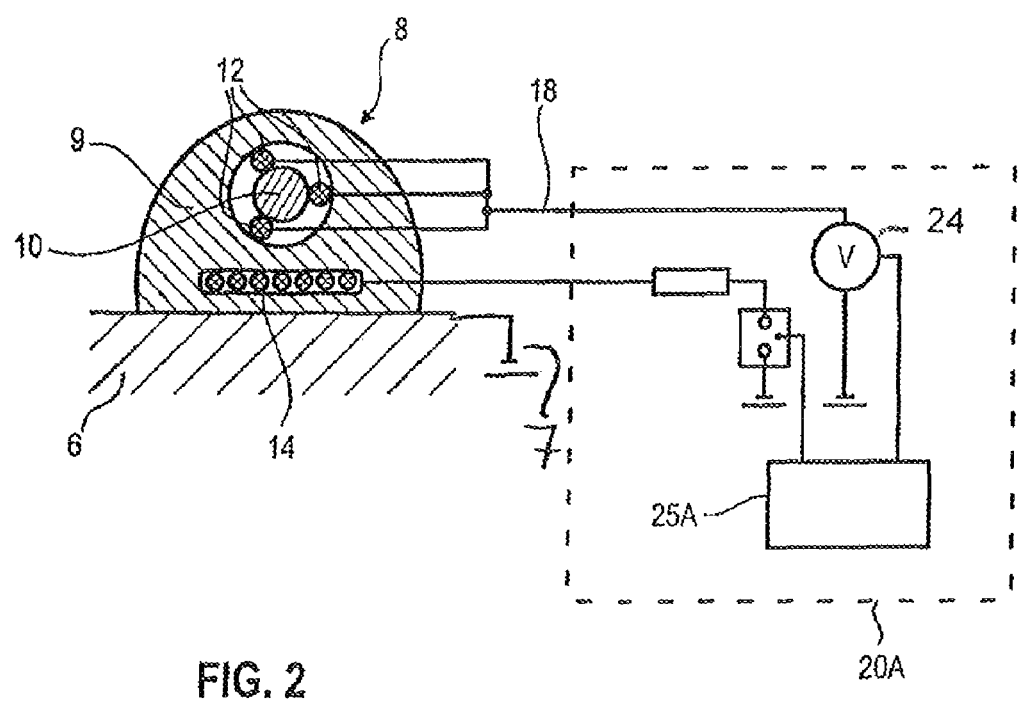
FIG. 2 shows a cross-sectional view through a sealing profile with an optical fiber integrated therein and first and second electrode with a circuit diagram for the electrical sensor.

As can be seen in particular in FIG. 2, the first electrode 12 is formed by three individual wires, which are wound helically around the optical fiber 10. The three wires together form the first electrode 12, which is connected to the evaluation subunit 20A via the common connecting line 18. In this evaluation subunit, a measuring unit 22 for sensing the voltage profile and voltage level is provided, which measuring unit bears against the first electrode 12. The first electrode in this case forms a reception electrode. In addition, the second electrode 14 in the manner of a braided wire is integrated into the sealing profile 9, in particular produced together with the sealing profile 9 by means of coextrusion. The second electrode 14 is connected to a voltage source 24, for example a transistor, of the evaluation subunit 20A. Furthermore, a control unit 25A is provided in the evaluation subunit 20A and is used to drive the voltage source 24 and at the same time also evaluates the voltage signal, measured via the measuring unit 22, from the first electrode 12. Suitable evaluation methods known per se are used, by means of the electrical sensor, to sense whether the electrical field forming has been changed owing to an object in the vicinity of the electrodes 12, 14. Such a change is then identified as an object entering the vicinity of the electrodes 12, 14.

The optical evaluation subunit 20B is also formed in a similar way to the electrical evaluation subunit 20A since, in the case of this optical evaluation subunit too, electrical control signals for driving the light source, on the one hand, and electrical response signals from the light sensor, on the other hand, are output and input. In a similar way, a control element is also provided here for driving the light source and for receiving the corresponding electrical signals from the light sensor and in particular for comparing them with the received signals, by comparison of the transmitted control signals to the light source, and evaluating them.

Figure 3:
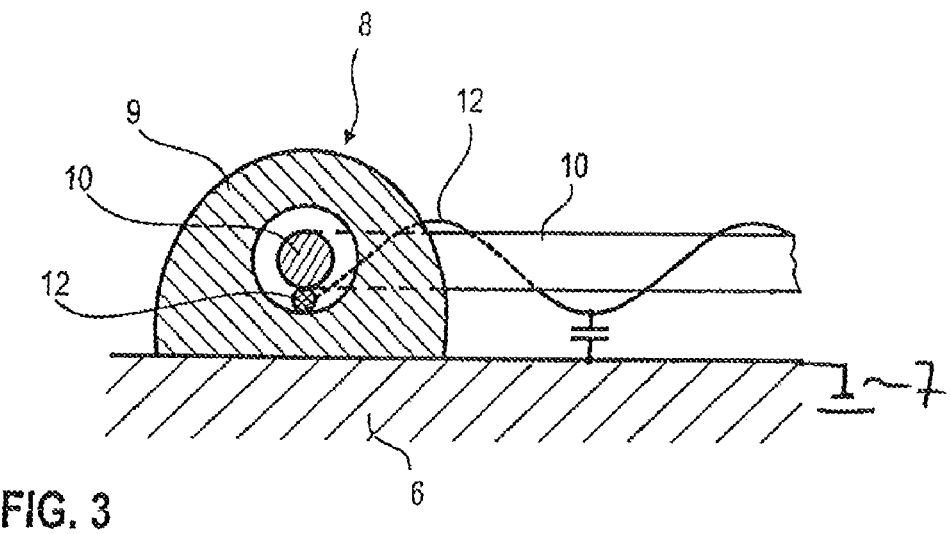
FIGS. 3-11 show cross-sectional illustrations through a sealing profile for a variety of exemplary embodiments of the invention.
Figure 4:
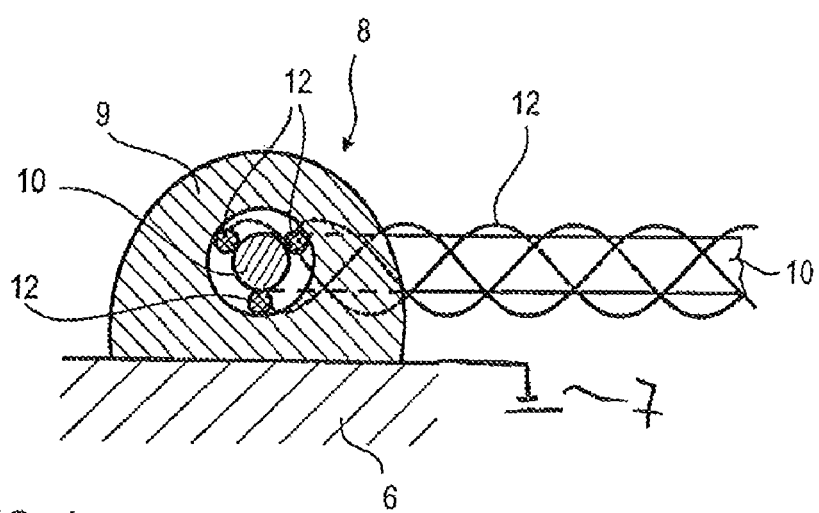
Figure 5:
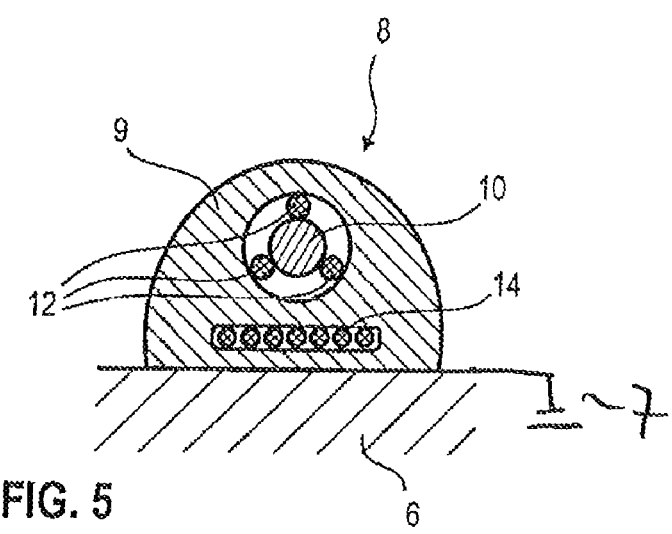

FIGS. 3 and 4 show a variant embodiment with only the first electrode 12, only one wire forming the electrode 12 in the case of FIG. 3. In the left-hand half of the diagram, in each case the section through the sealing profile, 9 is illustrated here and, in the right-hand half of the diagram, the profile, which extends in the propagation direction of the sensor element 8, of the optical fiber 10 with the first electrode 12 wound helically around it is illustrated. The use in principle of one electrode 12 is sufficient for forming the capacitive sensor (electrical sensor). However, as is illustrated in FIG. 2 and once again in FIG. 5, two electrodes 12, 14 are preferably used since this improves the sensitivity.

As an alternative to the variant embodiment illustrated in FIG. 1, in which both the optical fiber 10 and the electrodes 12, 14 are passed through from one end of the sensor element 8 to the other end, and in each case coupling elements 16 are provided at the two ends, it is also possible for the optical fiber 10 to be laid in the manner of a loop, with the result that light is both injected and output only at one coupling element 16. That is to say the optical fiber has a reversal point at that end of the sensor element 8 which is remote from the coupling element 16 and is passed back again in the sensor element 8, i.e. in the sealing profile 9. FIGS. 6 and 7 and 9 and 10 show such an application case, in which the optical fiber 10 with the first electrode 12 wound around it is in each case laid in the manner of a loop in the sealing profile 9. In this case, the first electrode 12 is preferably electrically isolated at the reversal point of the loop. Here, FIGS. 6 and 9 each show variant embodiments, in which in each case only the first electrode 12 is provided. In a case in which the electrode 12 is electrically isolated in particular at the reversal point of the loop, two electrodes 12, which are passed in parallel over the length of the sensor element 8, are thus available. In the exemplary embodiments in FIGS. 7 and 10, in each case again second electrodes 14 are provided and approximately correspond to the exemplary embodiment shown in FIGS. 2 and 5 with the difference that the optical fiber 10 is laid in a loop.

Figure 6:
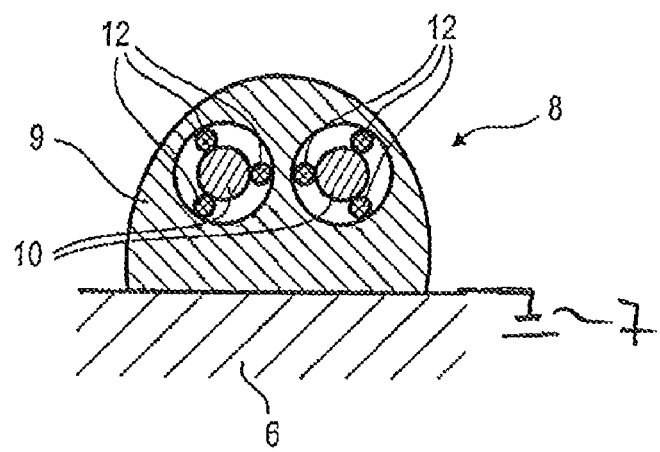
Figure 7:
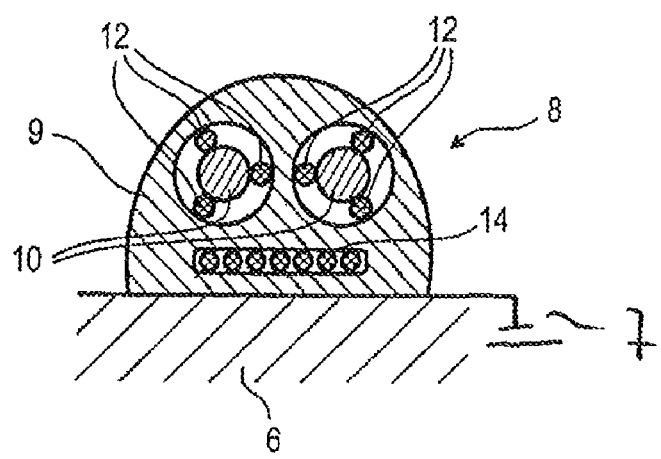
Figure 8:
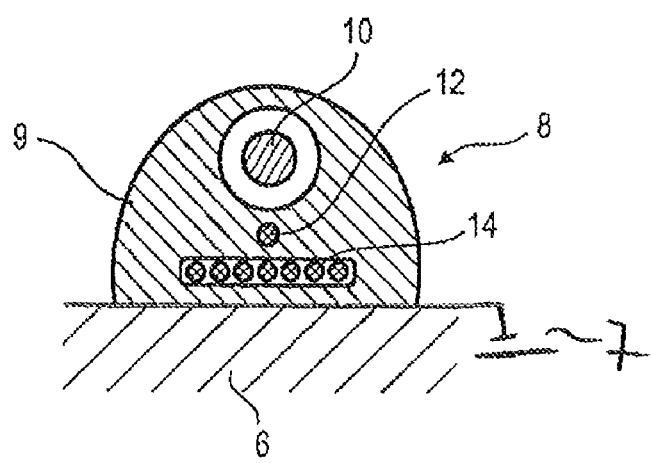
Figure 9:
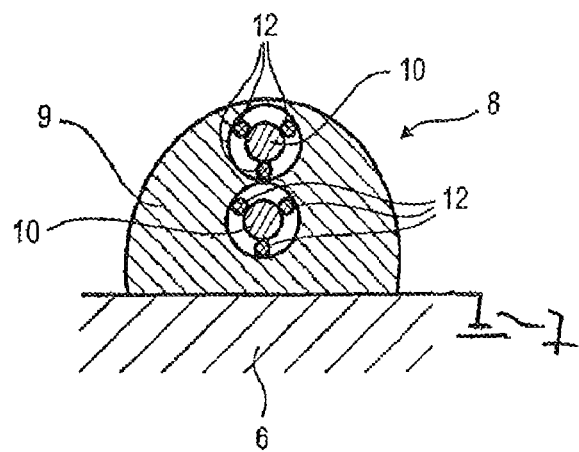
Figure 10:
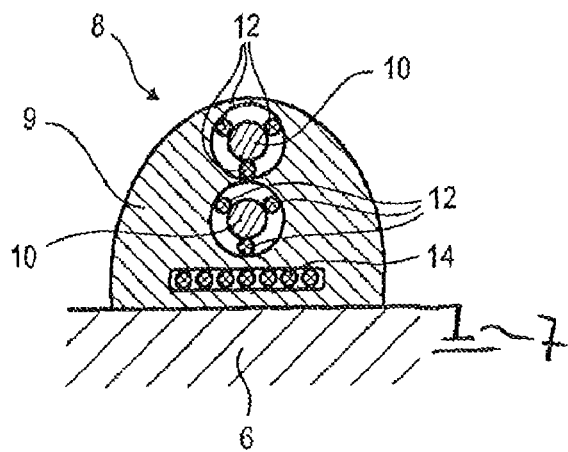

The exemplary embodiments in FIGS. 9 and 10 differ from those in FIGS. 6 and 7 by virtue of the fact that, in this case, the optical fiber 10 laid in a loop is oriented with its two subsections in a vertical direction instead of in the horizontal direction illustrated in FIGS. 6 and 7 (in relation to the propagation direction of the vehicle body 6, to which the sealing profile 9 is fixed). In this case, the vertical alignment shown in FIGS. 9 and 10 is preferred since this is advantageous in respect of the optical sensor.

Figure 11:
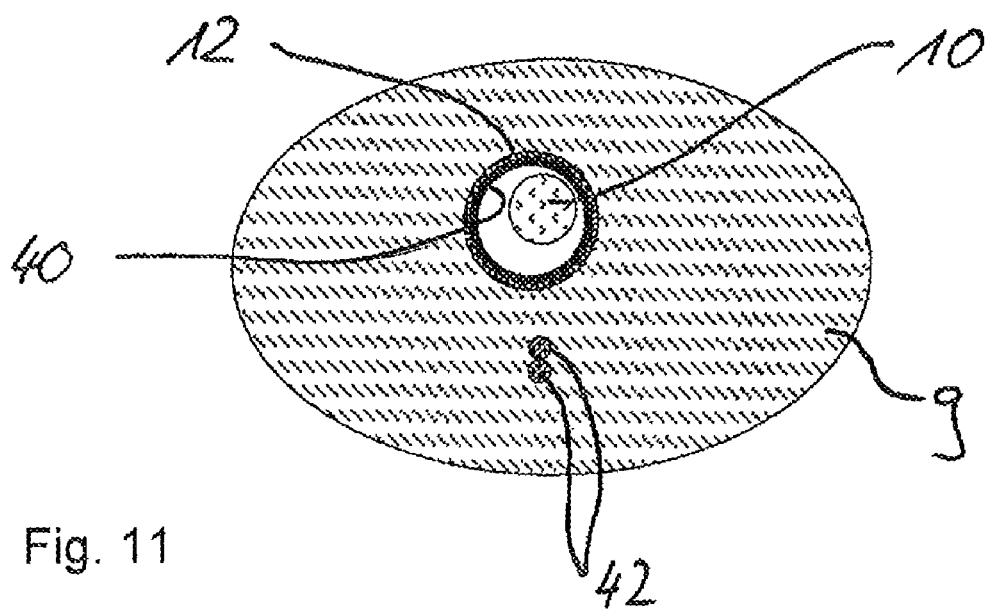

In contrast to the preceding exemplary embodiments, the electrode 12 is not designed to run directly around the optical fiber 10 in the exemplary embodiment shown in FIG. 11. Rather, the optical fiber 10 is arranged such that it runs loosely in a protective hose 40. A clearance is therefore formed between the optical fiber 10 and the inner wall of the protective hose 40. The protective hose 40 comprises an elastic material and is passed through the sealing profile 9 which forms the sheath. To this end, the sealing profile 9 has a suitable tube. The protective hose 40 is in turn surrounded by sleeve-like braiding which forms the first electrode 12. In this case, the braiding is designed in a known manner in the form of shielding braiding. In the exemplary embodiment shown in FIG. 11, the optical fiber 10 and the protective hose 40 are the pressure-sensitive optical sensor element, whereas the optical pressure-sensitive sensor element was directly formed by the sealing profile 9, which forms the sheath, in combination with the optical fiber 10 in the preceding exemplary embodiments.

In the variant embodiment shown in FIG. 11, provision is additionally made for supply lines 42 for supplying the light source of the optical pressure sensor to also run directly in the sealing profile 9. As an alternative to the additional arrangement of supply lines 42, the first electrodes 12 illustrated in FIGS. 2-10, for example, or else the second electrodes 14 are also used in a parallel manner as supply lines for the light source.

Figure 12:
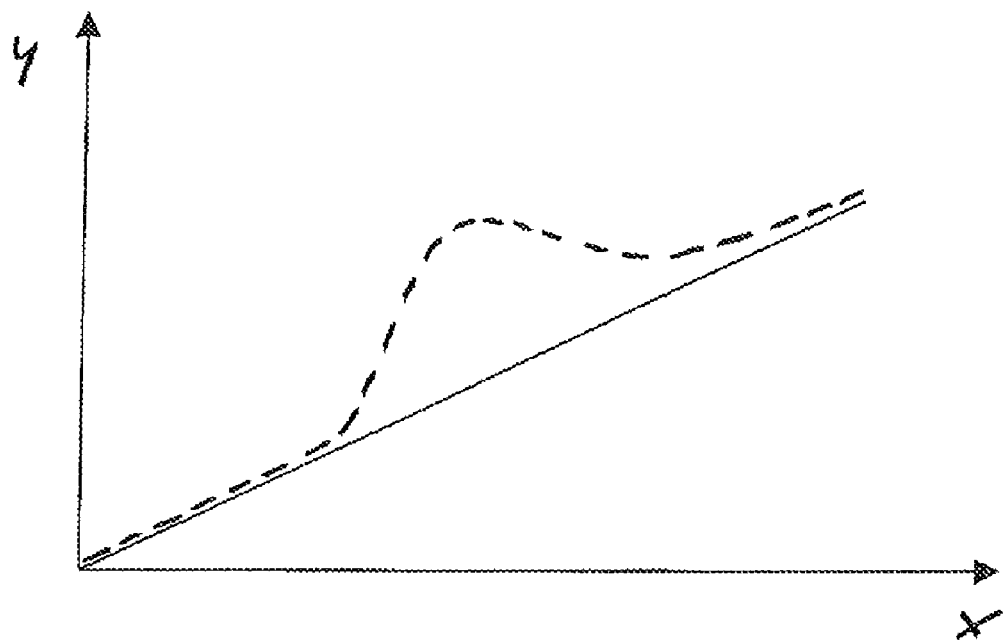
FIG. 12 is a graph illustrating exemplary profiles of signals from the electrical sensor.

FIG. 12 illustrates signal profiles of the sensor signal from the electrical sensor in a highly simplified and exemplary manner. To be precise, the movement path of the respective closing element, for example the door or window pane, is indicated in this case on the horizontal axis (X axis). The electrical measurement signal or a signal corresponding to the electrical measurement signal is plotted on the vertical axis (Y axis). The solid line represents the normal case of operation, that is to say if a change in the electrical field and thus in the measurement signal occurs as the closing element is approached. In this case, the solid line is preferably stored in the evaluation unit 20b following a learning process and characterizes a conventional process during operation in which an event of something being caught has not yet been detected.

The dashed line is used to illustrate an abnormal deviation from the normal signal profile according to the solid line, and this corresponds to the situation in which an external object passes between the window pane and the window frame, for example, thus giving rise to a risk of something being caught. This additional external object results in a characteristic deviation from the normal expected signal profile. This characteristic deviation from the normal signal profile, the so-called signature, is identified as being an event of something being caught.

Figure 13:
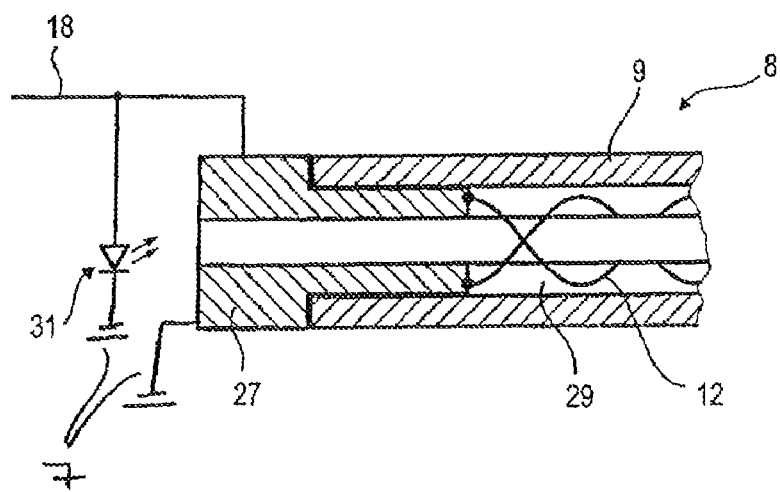
FIG. 13 shows a longitudinal section illustrating the end region of the optical fiber and a circuit diagram.

Finally, FIG. 13 also shows a longitudinal cross-section through one end of the sensor element 8 in the region of the coupling elements 16. The optical fiber 10 is surrounded by a so-called ferrule 27 at the end of said optical fiber 10. In general, a guide tube which accommodates the optical fiber in an optical waveguide plug is designated as the ferrule. In the exemplary embodiment, the ferrule 27 is preferably made from a conductive material, in particular from metal. The hose-like sheath formed by the sealing profile 9, which sheath surrounds the optical fiber 10 so as to include an interspace 29, adjoins the ferrule 27. Contact is made between the individual wires of the electrode 12 and the ferrule 27. At the other end of the ferrule, contact is made with the connecting line 18 such that the connection between the electrode 12 and the evaluation unit 20 can be produced via said connecting line 18. Contact is made between the connecting line 18 and the ferrule 27 preferably in the manner of a plug-in connection.

Furthermore, it can be seen from FIG. 13 that, in this exemplary embodiment, the connecting line 18 is at the same time also provided for supplying the light source 31 illustrated here. In this exemplary embodiment, only one connecting line between the evaluation unit 20 and the corresponding coupling element 16 is therefore required. In order to make clear signal evaluation possible here, suitable electrical filters may be used or the signals are modulated in a suitable manner.

The invention claimed is:

1. A sensor system, comprising:
   an optical pressure sensor having an optical sensor element with a light-guiding element;
   a light source disposed for injecting light into said light-guiding element;
   a light sensor for sensing light output from said light-guiding element;
   a first evaluation unit connected to said light sensor for evaluating the light output from said light-guiding element;
   an electrical sensor with an electrode connected to a voltage source; and
   a second evaluation unit connected to said electrical sensor for evaluating a voltage signal output by said electrical sensor.

2. The sensor system according to claim 1, wherein said optical pressure sensor and said electrical sensor are disposed for monitoring a motor-driven closing mechanism with regard to an object being caught between two relatively moving parts of the closing mechanism.

3. The sensor system according to claim 1, wherein said optical sensor element and said electrode are commonly disposed in a hose-shaped sheath.

4. The sensor system according to claim 1, wherein said optical sensor element is formed by said light-guiding element and said light-guiding element is substantially without cladding and spaced apart from said sheath.

5. The sensor system according to claim 1, wherein said optical sensor element is formed by said light-guiding element and a protective hose wherein said light-guiding element is loosely passed and enclosed.

6. The sensor system according to claim 4, wherein said electrode is passed along said light-guiding element.

7. The sensor system according to claim 1, wherein said electrode is wound around said light-guiding element.

8. The sensor system according to claim 4, wherein said electrode is formed of braiding directly disposed around said light-guiding element and leaving surface regions of said light-guiding element free at regular intervals.

9. The sensor system according to claim 8, wherein said electrode forms a spacer between said light-guiding element and said sheath.

10. The sensor system according to claim 1, wherein contact is made between said electrode and a ferrule at an end of said optical sensor element.

11. The sensor system according to claim 1, wherein said electrode is a first electrode, and wherein a second electrode is connected, as a transmission electrode, to the voltage source and is positioned opposite said first electrode, and said first electrode forms a reception electrode and is connected to said second evaluation unit.

12. The sensor system according to claim 11, wherein said optical sensor element and said first electrode are commonly disposed in a hose-shaped sheath, and one of said first and second electrodes is integrated in a wall of said hose-shaped sheath.

13. The sensor system according to claim 11, wherein said electrodes are integrated in the wall of the sheath, and said optical sensor element is passed through a cavity in the sheath.

14. The sensor system according to claim 11, wherein said electrode is embedded in said sheath by extrusion.

15. The sensor system according to claim 1, wherein said optical sensor element is disposed in a hose-shaped sheath and laid in a manner of a loop in said sheath.

16. The sensor system according to claim 3, wherein a supply line for said light source is co-integrated in said sheath.

17. The sensor system according to claim 16, wherein said supply line for said light source is configured to also form said electrode.

18. The sensor system according to claim 1, in which the light-guiding element is made from a conductive material and at the same time forms the electrode.

19. The sensor system according to claim 1, in which the sheath is made from a conductive material and at the same time forms the electrode.

20. The sensor system according to claim 1, in which the sheath is a sealing element for a closing element such as a door, for example.

21. The sensor system according to claim 1, in which the sheath is a sealing profile for a motor vehicle door, and a protective hose in which an optical fiber is loosely passed as a light-guiding element is embedded in the sheath, said electrode running along the protective hose.

22. The sensor system according to claim 1, configured as an anti-catch device for the closing mechanism, the evaluation units being designed in such a manner that, when it is detected that something is caught, a stop signal is generated for the closing mechanism.

23. A sensor element for a sensor system according to claim 1 comprising an optical sensor element, which is passed in a hose-shaped sheath, of an optical pressure sensor and an electrode, which extends in the direction of the hose-shaped sheath, of an electrical sensor.

24. A method for monitoring a closing mechanism for an object that may be caught between two parts of the closing mechanism which move in relation to one another with the aid of the sensor system according to claim 1, the method which comprises monitoring the closing mechanism in parallel with the aid of the optical pressure sensor and with the aid of the electrical sensor.

25. The method according to claim 24, which comprises evaluating a signal which is respectively sensed by the sensors for an object being caught with the aid of an evaluation algorithm.

26. The method according to claim 25, which comprises, if the sensed signal profile of one of the signals sensed by the sensors differs from an expected signal profile, determining that something is caught.

27. The method according to claim 26, which comprises stopping the closing mechanism upon an indication of an abnormal event.

28. The method according to claim 26, which comprises continuously checking the functionality of the optical pressure sensor and of the electrical sensor.

* * * * *